United States Patent [19]

Miwa et al.

[11] Patent Number: 4,818,547

[45] Date of Patent: Apr. 4, 1989

[54] METHOD FOR COOKING FOOD MATERIAL OF VARYING VOLUME

[76] Inventors: Yoshiyuki Miwa, 9, Sumihata, Satokomaki, Kisogawa-cho, Haguri-gun, Aichi-ken; Kazuya Miyake, 416, Usagishinden, Shirone-shi, Niigata-ken, both of Japan

[21] Appl. No.: 48,937

[22] Filed: May 12, 1987

[30] Foreign Application Priority Data

May 12, 1986 [JP] Japan .................................. 61-108338

[51] Int. Cl.⁴ ................................................ A23L 1/01
[52] U.S. Cl. ...................................... 426/233; 426/523
[58] Field of Search ....................... 426/233, 243, 523; 219/441, 497; 340/589

[56] References Cited

U.S. PATENT DOCUMENTS 4,463,249 7/1984 Narita et al. ......................... 219/441

*Primary Examiner*—George Yeung
*Attorney, Agent, or Firm*—Finnegan, Henderson, Farabow, Garrett & Dunner

[57] ABSTRACT

A method for cooking food materials of varying volume in a cooking apparatus or measuring the volume of the cooking material. The method for measuring includes the steps of heating a quantity of food material to a prescribed set temperature in the cooking apparatus, stopping the heating for a first predetermined period for radiating heat from the food material, applying heat to the food material for a second prescribed period, detecting the actual temperature of the food material, measuring a period elapsed until the detecting, and computing a value corresponding to the thermal capacity of the material in the cooking apparatus from the detected temperature and the elapsed time. The method for cooking further includes the step of starting a cooking operation to the food material in the cooking apparatus at a time corresponding to the computed value.

12 Claims, 4 Drawing Sheets

METHOD FOR COOKING FOOD MATERIAL OF VARYING VOLUME

BACKGROUND OF THE INVENTION

1. Field of the Invention

The present invention relates to a method for cooking food material of varying volume, such as water and rice in a cooking apparatus.

2. Description of the Prior Art

In a cooking device such as an electric rice cooker, and particularly in an electric rice cooker capable of cooking rice by a timer operation, a cooking control circuit having a clock function is provided. The cooking control circuit in recent electric rice cookers has included a microcomputer which is capable of performing the clock function and other various controls in the cooking operation. When a user sets a desired cooking completion time into the cooking control circuit, the cooking control circuit calculates a timer operation running period from the present time to the desired cooking completion time. The cooking control circuit then subtracts the period required for the cooking operation, that is, a specified cooking operation period set previously in the cooking control circuit, from the timer operation running period. This calculates a time for starting the cooking operation. As a result, the cooking operation starts at the calculated cooking operation starting time, and finishes at the desired cooking completion time.

It is well known that in an electric rice cooker, the cooking operation period varies in relation to the amount or volume of food material to be cooked, i.e., volume of water and rice, which are contained together in the electric rice cooker. That is, the cooking operation period takes longer when the volume of the food material is greater. However, the electric rice cooker as described above has no function for measuring the volume of food material to be cooked. Therefore, the cooking operation period typically is determined uniformly based on the maximum capacity of the electric rice cooker, and this value is stored in the cooking control circuit. However, when the volume of the food material to be cooked is less than the maximum capacity of the electric rice cooker, for example, when the volume of food material to be cooked is in the small or medium capacity range of the electric rice cooker, the correct cooking operation period is shorter than this stored cooking operation period. As a result, when setting a desired cooking completion time for cooking a volume of food material in the small or medium capacity range, the cooking operation finishes before the desired cooking completion time. This is because the cooking start time is determined by the stored cooking operation period, which is determined by the maximum capacity of the electric rice cooker. In other words, the desired cooking completion time is later than the time when the actual cooking operation is completed.

It is also known that in an electric rice cooker, the cooking operation period varies in relation to the ambient temperature or the temperature of the food material to be cooked, i.e., water and rice, before the cooking operation starts. That is, the cooking operation period takes longer when the initial temperature of the food material to be cooked is relatively low. This occurs, for example, in winter. However, the electric rice cooker as described above has no capability to adjust the cooking operation period in accordance with the temperature of the food material to be cooked before starting the cooking operation.

Such circumstances also apply to the measurement of volumes of various other food materials to be cooked, such as soybeans, etc.

SUMMARY OF THE INVENTION

Accordingly, an object of the present invention is to provide a method for completing cooking of a food material with varying volume in a cooking apparatus at a desired time.

Another object of the present invention is to provide a method for cooking a food material with varying volume in a cooking device, without fear of incorrect timing of the cooking operation due to the initial temperature of the food material to be cooked.

A further object of the present invention is to provide a method for measuring the volume or thermal capacity of a food material in a cooking apparatus.

In order to achieve the above objects, the method for cooking food materials of varying volume in a cooking apparatus according to one aspect of the present invention includes the steps of heating a quantity of food material to a prescribed set temperature in the cooking apparatus, stopping the heating for a first predetermined period for radiating heat from the food material, applying heat to the food material for a second prescribed period, detecting the actual temperature of the food material, measuring a period elapsed until the detecting, computing a value corresponding to the thermal capacity of the material in the cooking apparatus from the detected temperature and the elapsed time and starting a cooking operation to the food material in the cooking apparatus at a time corresponding to the computed value.

Further, the method for measuring volume of a food material in a cooking apparatus according to another aspect of the present invention includes the steps of heating a quantity of food material to a prescribed set temperature in the cooking apparatus, stopping the heating for a first predetermined period for radiating heat from the food material, applying heat to the food material for a second prescribed period, detecting the actual temperature of the food material, measuring a period elapsed until the detecting and computing a value corresponding to the thermal capacity of the material in the cooking apparatus from the detected temperature and the elapsed time.

The method for cooking a food material contained in a cooking apparatus or measuring the volume of the food material according to the present invention has a feature in that the temperature change characteristic of the food material to be cooked has a complicated relation with both the volume of food material to be cooked and an initial temperature of the food material at a start of cooking operation. The initial temperature of the food material to be cooked is influenced by an ambient temperature, e.g., a room temperature. In the present invention, heating and radiation heat of the food material to be cooked are performed so as to measure the actual volume or thermal capacity of the food material to be cooked from the fact that the temperature change characteristics in the heating and the radiation heat of the food material to be cooked are related to the volume of the food material to be cooked and the initial temperature of the food material to be cooked.

The initial temperature of the food material to be cooked is compensated to a prescribed set temperature by heating the food material to be cooked until the food material to be cooked reaches the set temperature. In this case, a time required for heating the food material to be cooked to the set temperature varies in accordance with the initial temperature. Then, the food material to be cooked radiates its heat by stopping the heating and continuing the stopping of the heating for a first prescribed period. The heat radiation characteristics of the food material to be cooked also varies in accordance with the ambient temperature. The food material to be cooked is again heated for a second prescribed period after the heat radiation. Therefore, the total time elapsed from the start of first heating to the end of the second heating varies in accordance with the initial temperature of the food material to be cooked or the ambient temperature. The total elapsed time and a final temperature of the food material to be cooked are related to the volume of the food material to be cooked with a prescribed relation. As a result, the volume of food material to be cooked can be detected by measuring the total elapsed time and the final temperature.

DESCRIPTION OF THE PREFERRED EMBODIMENTS

Figure 1:
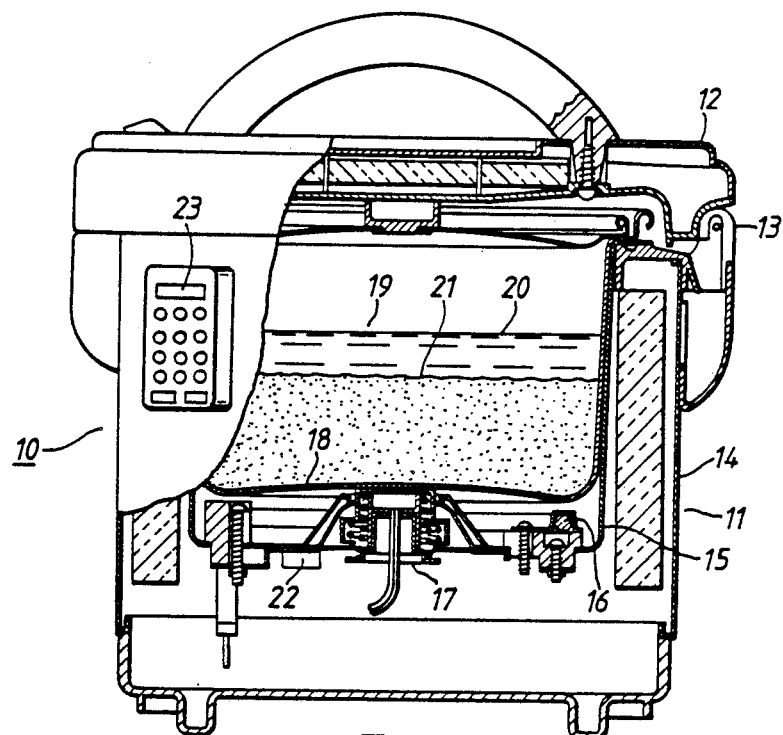
FIG. 1 is a cross-sectional side view showing the general construction of a conventional electric rice cooker.

The present invention will now be described in detail with reference to the accompanying drawings, namely, FIGS. 1 to 8. Throughout the drawings, like reference numerals and letters are used to designate like or equivalent elements for the sake of simplicity of explanation.

Referring now to FIG. 1, a general construction of typical electric rice cookers will be explained. FIG. 1 shows a cross-section in part of an electric rice cooker 10. The electric rice cooker 10 has a main body 11 and a lid 12. The lid 12 is swingably mounted to the top end of the main body 11 through a hinge 13. The main body 11 has an outer vessel 14 formed in a cylindrical shape with a bottom and an inner vessel 15 mounted inside the outer vessel 14. The inner vessel 15 is also formed in a cylindrical shape with a bottom. The inner vessel 15 is equipped with a heater 16 and a thermo-sensor unit 17 on its bottom. The inner vessel 15 is provided for receiving a pan 18. When the pan 18 is set in the inner vessel 15, the heater 16 faces a bottom section of the pan 18 and the thermo-sensor unit 17 contacts the bottom section of the pan 18. Thus, the heater 16 heats a food material 19 to be cooked in the pan 18, which consists of water 20 and rice 21 to be boiled with the water 20. The thermo-sensor unit 17 detects the temperature of the pan 18. Here, the temperature of the pan 18 can be assumed to be almost the same as the temperature of the food material 19 to be cooked in the pan 18.

The electric rice cooker 10 is further provided with a cooking controller 22. The cooking controller 22 is schematically shown in the drawing of FIG. 1. The cooking controller 22 comprises a microcomputer (not shown in the drawing), which has a current control function for the heater 16 in response to the thermo-sensor unit 17. The microcomputer also has a clock function, so that the electric rice cooker 10 is provided with timer operation cooking.

The outline of the timer operation cooking will now be described. When a user sets a desired cooking completion time into the cooking controller 22 through an input device such as a control panel 23, the cooking controller 22 subtracts the present time from the desired cooking completion time to obtain the total time to be elapsed until the cooking completion time. The cooking controller 22 then subtracts a prescribed cooking operation period from the total time. This and other prescribed cooking operation periods are previously set in a memory such as an ROM (Read Only Memory) in the cooking controller 22, in accordance with capacity ranges, e.g., a large (L), a medium (M) and a small (S) capacity ranges, of the electric rice cooker 10. As a result, the cooking controller 22 calculates a time for starting the cooking operation preferable for the volume or thermal capacity of the food material 19 to be cooked. When a volume of the food material 19 to be cooked is measured as described later, one of the cooking operation start times corresponding to the volume of the food material 19 to be cooked is accessed from the memory. Then, the cooking controller 22 turns on the heater 16 at the specified cooking operation start time to perform the cooking operation for the food material 19 in the pan 18.

A method for measuring the volume of the food material 19 to be cooked according to the present invention will be described in detail below, in reference to FIG. 3. In this embodiment, it is assumed that three general capacity ranges L, M and S are defined for the electric rice cooker 10. A large capacity L ranges more than 70% of the maximum or full capacity F of the electric rice cooker 10 (i.e., $F \geq L \geq 0.7F$). A small capacity S ranges less than 30% of the full capacity F (i.e., $0.3F \geq S > 0F$). A medium capacity M is between the large capacity L and the small capacity S (i.e., $0.7F > M > 0.3F$). It is also assumed that a measurement of the volume of the food material 19 to be cooked corresponds to any one of the three capcity ranges L, M and S.

Figure 3:
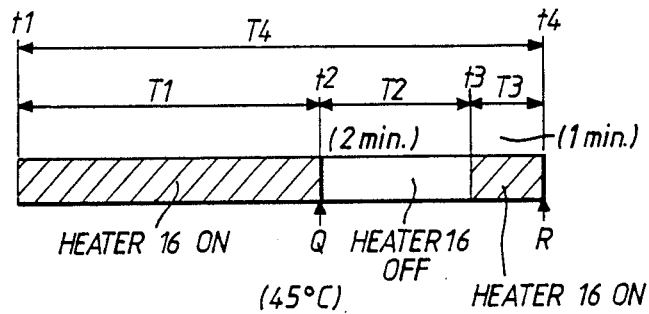
FIG. 3 is a time chart showing on/off operations of the heater in FIG. 1, according to the present invention.

In the measuring operation, the cooking controller 22 turns on the heater 16 at a time t1 as shown in FIG. 3, so that the heater 16 heats the food material 19 to be cooked in the pan 18. When the food material 19 reaches a prescribed set temperature Q, for example 45° C. (the period required for the heating operation is taken as T1), the cooking controller 22 turns off the heater 16 at the end of the period T1 (the time at the end of the period T1 is taken as t2). Then the turn off state of the heater 16 is maintained for a first prescribed period T2, for example, two minutes (the time at the end of the period T2 is taken as t3). The food material 19 therefore radiates it heat during the heat radiation period T2. The cooking controller 22 again turns on the heater 16 at the time t3, i.e, the end of the heat radiation period T2. The cooking controller 22 maintains the turn on state of the heater 16 for a second prescribed period T3, for example, one minute (the time at the end of the period T3, i.e., the finishing time of the measurement operation is taken as t4). The cooking controller 22 then detects a final temperature R of the food material 19 through the thermo-sensor unit 17 at that time t4. The cooking controller 22 further counts the period T4 from the time t1, i.e. the measurement operation start time, to the time t4, i.e., the measurement operation finish time.

Figure 2:
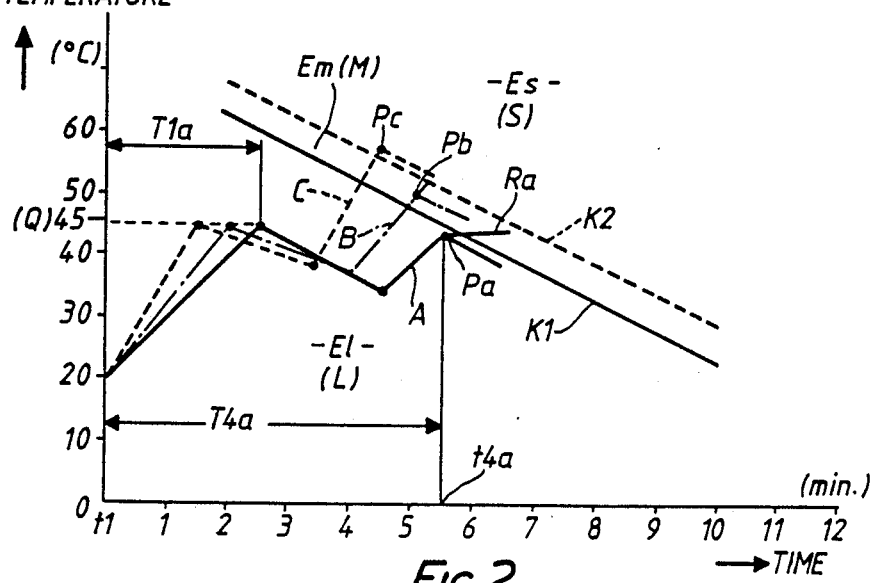
FIG. 2 is a temperature change characteristic diagram of a food material during measurement of the volume of the food material to be cooked contained in a cooking device according to the present invention.

The temperature change of the food material 19 to be cooked in this case is described on the assumption that the temperature change takes any one of characteristic lines A, B and C in FIG. 2. In FIG. 2, times and periods are taken on the X-coordinate from the measurement operation start time t1, while temperatures are taken on the Y-coordinate from 0° C. Lines K1 and K2 define three zones E1, Em and Es corresponding to the three capacity ranges, L, M and S. When a coordinate (referred to as a final coordinate hereafter) given by the measurement operation finish time t4 and the final temperature R belongs to the zone E1 below the line K1, as shown by Pa in FIG. 2, the measurement operation determines that the volume of the food material 19 to be cooked is in the large capacity range L, as described later. When the final coordinate falls in the zone Es above the line K2, as shown by Pc in FIG. 2, the volume of the food material 19 to be cooked is in the small capacity range S. When the final coordinate falls in the zone Em between the lines K1 and K2, as shown by Pb in FIG. 2, the volume of the food material 19 to be cooked is in the medium capacity range M.

When assuming that the temperature change of the food material 19 to be cooked is shown by the characteristic line A in FIG. 2, the first heating period T1 in FIG. 3 is shown by time T1a. The final temperature at the measurement operation finishing time t4, which corresponds to the final coordinate Pa on the temperature change characteristic line A, is shown by Ra and the required measurement operation period at that case is shown by T4a. From the fact that the final coordinate Pa of the temperature change characteristic line A belongs to the zone E1, it is determined that the volume of the food material 19 to be cooked is in the large capacity range L. Also, when the temperature change of the food material 19 to be cooked is shown by the characteristic line B, the final coordinate Pb on the temperature change characteristic line B fails in the zone Em between the lines K1 and K2. As a result, it is determined that the volume of the food material 19 to be cooked is in the medium capacity range M. Further, when the temperature change of the food material 19 is shown by the characteristic line C, the final coordinate Pc on the temperature change characteristic line C falls in the zone Es above the line K2. As a result, it is determined that the volume of the food material 19 to be cooked is in the small capacity range S.

Figure 4:
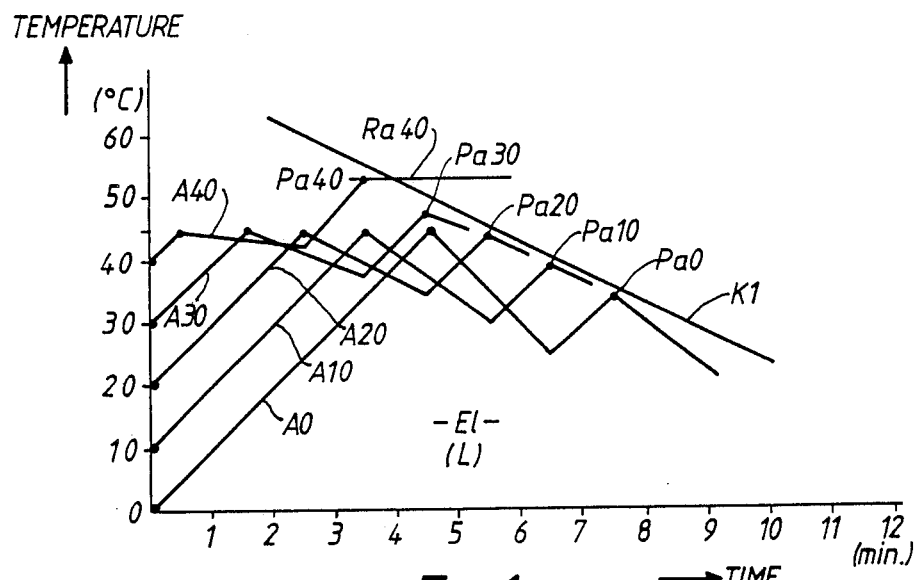
FIG. 4 is a temperature change characteristic diagram related to the initial temperature when the volume of a food material to be cooked is in the large capacity range of an electric rice cooker.

The lines K1 and K2 described above are specified as follows in relation to both the volume of the food material 19 to be cooked and its initial temperature (especially, the initial temperature of water). First, the line K1 for defining the zone E1 corresponding to the large capacity range L will be described in reference to FIG. 4. FIG. 4 shows the temperature change characteristic of the food material 19 to be cooked corresponds to the capacity 0.7F of the electric rice cooker 10. The volume 0.7F of the food material 19 to be cooked corresponds to the minimum level of the large capacity range L. Each temperature change characteristic line A0, A10, A20, A30 and A40 corresponds to the characteristic line when the initial temperature is 0° C., 10° C., 20° C., 30° C. and 40° C., respectively. These temperature change characteristic lines A0, A10, A20, A30 and A40 show the temperature change obtained when performing the heating and the heat radiation of the food material 19 to be cooked according to the time chart shown in FIG. 3, that is, the method of the embodiment. As will be clear from the comparison of the temperature change characteristic lines A0, A10, A20, A30 and A40, each Y-coordinate of the final coordinates Pa0, Pa10, Pa20, Pa30 and Pa40, i.e., each of the final temperatures Ra0, Ra10, Ra20, Ra30 and Ra40 is relatively low, and each of the required measurement operation periods T4a0, T4a10, T4a20, T4a30 and T4a40 becomes relatively long. Then, the aforementioned line K1 is obtained by approximating a line linking the final coordinates Pa0, Pa10, Pa20, Pa30 and Pa40. First set of prescribed constants or parameters corresponding to the line K1 previously are set in the memory.

Figure 5:
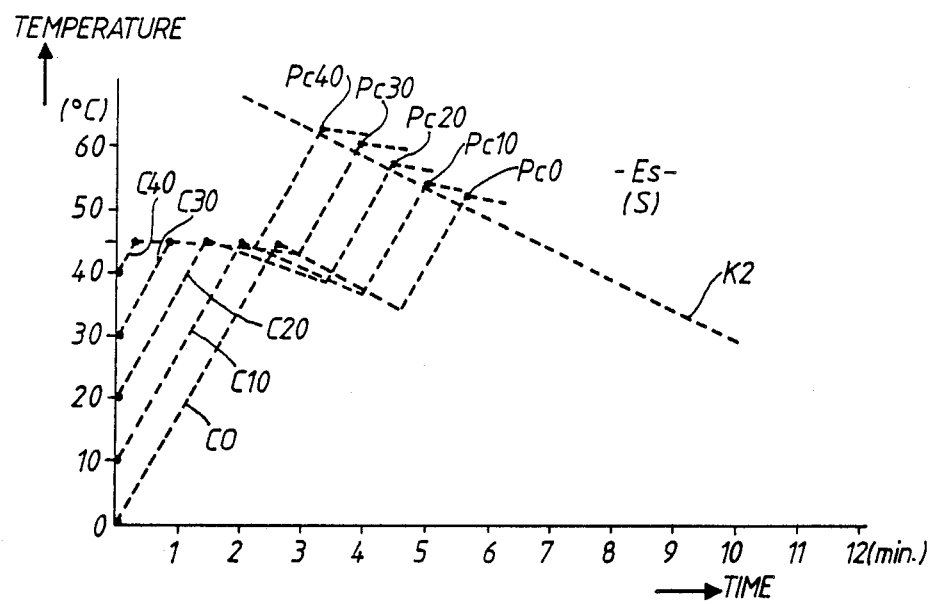
FIG. 5 is a temperature change characteristic diagram related to the initial temperature when the volume of a food material to be cooked is in the small capacity range of an electric rice cooker.

Next, the line K2 for defining the zone Es corresponding to the small capacity range S will be described in reference to FIG. 5. FIG. 5 shows the temperature change characteristic of the food material 19 to be cooked when the volume of the food material 19 to be cooked corresponds to the capacity 0.3F of the electric rice cooker 10. The volume 0.3F of the food material 19 to be cooked corresponds to the maximum level of the small capacity range S. Each temperature change characteristic line C0, C10, C20, C30 and C40 corresponds to the characteristic line when the initial temperature is 0° C., 10° C., 20° C., 30° C. and 40° C., respectively. These temperature change characteristic lines C0, C10, C20, C30 and C40 show the temperature change obtained when performing the heating and the heat radiation of the food material 19 to be cooked according to the time chart shown in FIG. 3, that is, the method of the embodiment. As will be clear from the comparison of the temperature change characteristic lines C0, C10, C20, C30 and C40, each Y-coordinate of the final coordinates Pc0, Pc10, Pc20, Pc30 and Pc40, i.e., each of the final temperatures Rc0, Rc10, Rc20, Rc30 and Rc40 is relatively high, and each of the required movement operation periods T4c0, T4c10, T4c0, T4c30 and T4c40 becomes relatively short. Then, the aforementioned line K2 is obtained by approximating a line linking the final coordinates Pc0, Pc10, Pc20, Pc30 and Pc40. Second set of prescribed constants or parameters corresponding to the line K2 previously are set in the memory.

When comparing the second line K2 with the first line K1, the second line K2 is shifted in the direction where the final temperatures R are raised, and the required measurement operation periods Ts are prolonged more than those of the first line K1. As will be clear from the comparisons of the final temperatures R and the required measurement operation periods T4 between the lines K1 and K2, it is shown that in the zone E1 on the side where the final temperatures R are lowered and the required measurement operation periods Ts are shortened in comparison to those of the first line K1, the volume of the food material 19 to be cooked is in the large capacity range L. In the zone Es on teh side where the final temperatures R are raised and the required measurement operation periods T4 are prolonged in comparison to those of the second line K2, the volume of the food material 19 to be cooked is in the small capacity range S.

Figure 6:
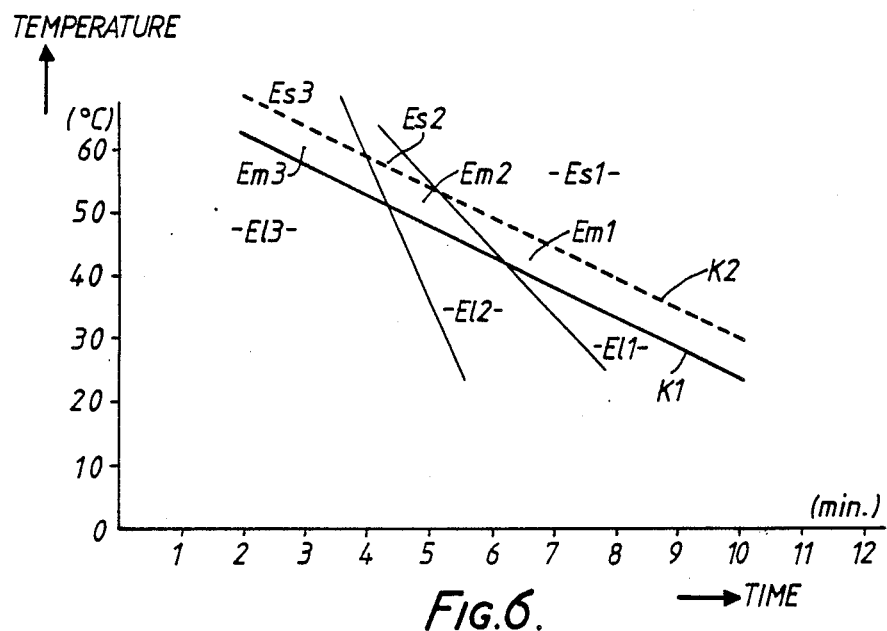
FIG. 6 is a diagram showing the relation between capacity ranges of an electric rice cooker and the initial temperature of the food material to be cooked.

In FIG. 6, a division of the initial temperature into three stages is shown, in addition to the division of the capacity range. In FIG. 6, subzones with additive letters "3", "2" and "1" added to the letters E1, Em and Es, correspond to the initial temperatures of "high", "medium" and "low", respectively.

Figure 7:
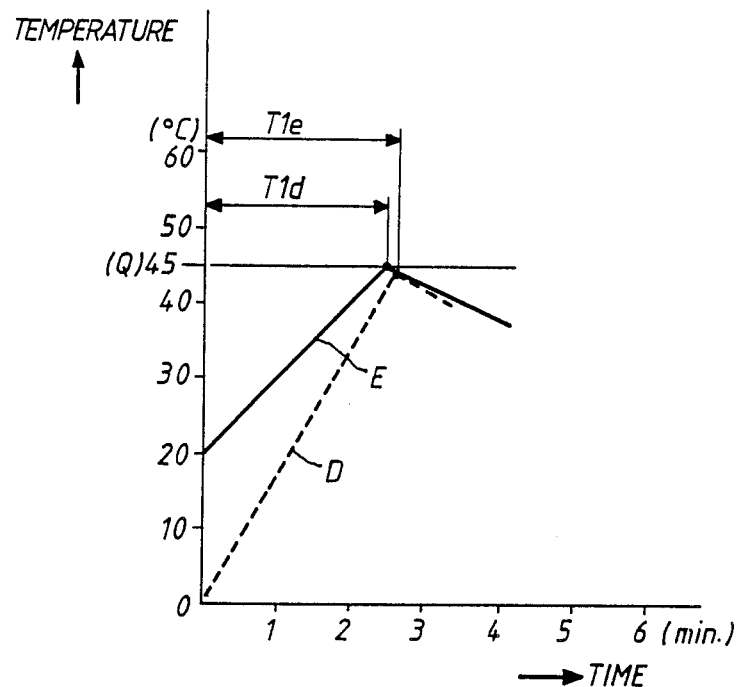
FIG. 7 is a temperature change characteristic diagram for explaining the method of the present invention.

Referring now to FIG. 7, another, but presently considered less desirable method for measuring the volume of the food material 19 to be cooked will be described. Instead of the above method, the volume of the food material 19 to be cooked and its thermal capacity can be determined by detecting the period T1 required to heat the food material 19 to be cooked up to the prescribed set temperature Q, and measuring the volume of the food material 19 to be cooked on the basis of the prescribed set temperature Q. In this case, however, as will be clear from FIG. 7, when the volume of the food material 19 to be cooked is in the small capacity range S and the initial temperature is in "low" temperature stage, the temperature change of the food material 19 to be cooked is given by the characteristic line D. In this case, the first heating operation period T1 becomes T1d as shown in FIG. 7. When the volume of the food material 19 to be cooked is in the medium capacity range M and the initial temperature is in the "medium" temperature stage, the temperature change of the food material 19 to be cooked is given by the characteristic line E. In this case, the first heating operation period T1 becomes T1e as shown in FIG. 7. As clearly seen from FIG. 7, these two first heating operation periods T1d and T1e become closer to each other, or become substantially equal. As a result, in this method, the volume of the food material 19 to be cooked may be erroneously measured. Such an error also can be caused between the stiuations where the volume of the food material 19 to be cooked is in the medium capacity range M and the initial temperature is in the "medium" temperature stage, as shown by the characteristic line E, and the case where the volume of the food material 19 to be cooked is in the large capacity range L and the initial temperature is in the "high" temperature stage. That is, the variations of the initial temperature cause error in measuring the volume of the food material.

In the embodiment according to the present invention, as described by referring to FIG. 3, the food material 19 to be cooked is heated up to the prescribed set temperature Q. As a result, the initial temperature of the food material 19 to be cooked is corrected to the same set temperature Q. In this case, the required first heating operation period T1 is determined by the degree of the initial temperature of the food material 19 to be cooked. After that, the heat of the food material 19 to be cooked is radiated for the prescribed heat radiation period T2. The temperature resulting from the heat radiation at the end of the heat radiation period T2 (for example, Q on the characteristic line A in FIG. 2) is determined with relation to the ambient temperature. In other words, the temperature Q due to the heat radiation is determined by the ambient temperature which determines the initial temperature of the food material 19 to be cooked. After the heat radiation, by heating the food material 19 to be cooked again for the prescribed heating operation period T3, the final temperature R is detected through the thermo-sensor unit 17 at the measurement operation finishing time t4 when the second heating operation period T3 is elapsed. Also the required measurement operation period T4 between the times t1 and t4 is calculated. The amount or volume of the food material 19 to be cooked is measured on the basis of the final temperature R and the required measurement operation period T4 (e.g., the final coordinate Pa of the temperature change characteristic line A in FIG. 2).

According to this embodiment, therefore, the volume of the food material 19 to be cooked can be measured accurately without influence from variations of the initial temperature of the food material 19 to be cooked.

The relation between the final temperatures R and the required measurement operation periods T4 specified by the first and second capacity zone defining lines K1 and K2 is previously set in the memory of the cooking controller 22 of the electric rice cooker 10 as preset data. When a user sets a desired cooking completion time t6 to the timer function of the cooking controller 22 through the control panel 23, the measurement operation, as described above, is carried out at the time t1 after a specified period T0 from the timer setting time t0 (see FIG. 8), and the previously stored data for calculating the volume of the food material 19 to be cooked, such as data on the zone defining lines K1 and K2, is accessed. Then, the cooking controller 22 measures the volume of the food material 19 to be cooked, on the basis of the detected final temperature R and the required measurement operation periods T4. The cooking controller 22 accesses the proper cooking operation period data from the memory, in accordance with the capacity range L, M or S corresponding to the volume of the food material 19 to be cooked. Then the cooking controller 22 starts the cooking operation for the food material 19 to be cooked at the time t1 well before a start of a required cooking operation period T5 in correspondence with the capacity ranges L, M and S of the cooking material 19 to be cooked. In this case, the cooking operation period T5 is set according to the following table, on the basis of the final temperature R and the required measurement operation period T4. These parameters determine whether the final coordinate P of the temperature change characteristic line corresponds to the zone E13 to E11, Em3 to Em1, or Es3 to Es1 (see FIG. 6).

| Zone | Cooking Operation Period |
| --- | --- |
| E11 | 60 minutes |
| E12, Em1 | 55 minutes |
| E13, Em2, Es1 | 50 minutes |
| Em3, Es2 | 45 minutes |
| Es3 | 40 minutes |

Figure 8:
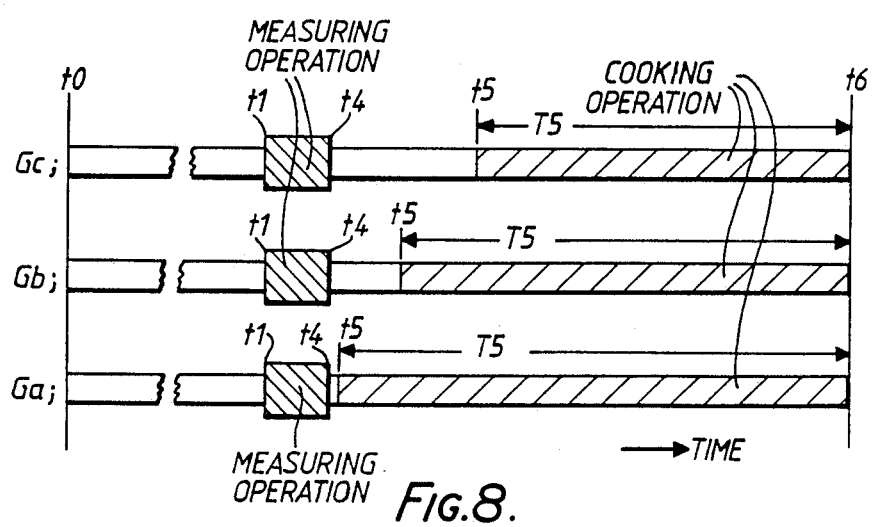
FIG. 8 is a time chart showing an example of the cooking operation of an electric rice cooker in FIG. 1, according to the present invention.

Accordingly, the cooking operation start time t5 is calculated so as to correspond to the volume or thermal capacity of the food material 19 to be cooked. FIG. 8 shows examples of the time charts according to the present invention. Graph Ga shows the time chart when the volume of the food material 19 to be cooked is in the large capacity L (for example, the zone E11 in FIG. 6). Graph Gb shows the time chart when the volume of the food material 19 to be cooked is in the medium capacity M (for example, the zone Em2 in FIG. 6). Graph Gc shows the time chart when the volume of the food material 19 to be cooked is in the small capacity S (for example, the zone Es2 in FIG. 6). As will be clear from FIG. 8, the cooking operations in the respective capacity ranges are completed at the same desired cooking completion time T6, irrespective of the volume of the food material 19 to be cooked in the electric rice cooker 10.

In the embodiment described above, a food material to be cooked, such as rice and water, is illustrated. However, any other food material to be cooked, such as soybeans and water may be similarly measured and cooked according to the present invention.

As will be clear from the above description, one aspect of the present invention is a method for cooking food materials of varying volume in a cooking apparatus, which comprises the steps of heating a quantity of food material to a prescribed set temperature in the cooking apparatus, stopping the heating for a first predetermined period for radiating heat from the food material, applying heat to the food material for a second prescribed period, detecting the actual temperature of the food material, measuring a period elapsed until the detecting, computing a value corresponding to the thermal capacity of the material in the cooking apparatus from the detected temperature and the elapsed time and starting a cooking operation to the food material in the cooking apparatus at a time corresponding to the computed value.

Another aspect of the present invention is a method for measuring volume of a food material in a cooking apparatus, which comprises the steps of heating a quantity of food material to a prescribed set temperature in the cooking apparatus, stopping the heating for a first predetermined period for radiating heat from the food material, applying heat to the food material for a second prescribed period, detecting the actual temperature of the food material, measuring a period elapsed until the detecting and computing a value corresponding to the thermal capacity of the material in the cooking apparatus from the detected temperature and the elapsed time.

As described above, the present invention can provide extremely preferable methods for automatically cooking a food material to be cooked, and for measuring the volume of the food material to be cooked.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teaching of the present invention without departing from the central scope thereof. Therefore, it is intended that this invention not be limited to the particular embodiment disclosed as the best mode contemplated for carrying out this invention, but that the invention include all embodiments falling within the scope of the appended claims.

What is claimed is:

1. A method for cooking food materals of varying volume in a cooking apparatus comprising the steps of:
   heating a quantity of food material to a prescribed set temperature in the cooking apparatus;
   stopping the heating for a first predetermined period for radiating heat from the food material;
   applying heat to the food material for a second prescribed period;
   detecting a final temperature of the food material;
   measuring a period elapsed from the step of heating a quantity of food material until the detecting step;
   computing a value, corresponding to the thermal capacity of the food material in the cooking apparatus, from the detected temperature and the elapsed period; and
   raising the temperature of the food material in the cooking apparatus to a prescribed cooking temperature for a period corresponding to the computed value.

2. The method of claim 1 also including the step of manually entering a desired cooking completion time into an input device of the cooking apparatus and wherein the step of raising the temperature includes the step of automatically calculating the cooking operation period from the desired cooking completion time and the calculated value.

3. The method of claim 2 wherein the step of computing includes the step of obtaining prescribed stored constants from a memory by a controller means and the step of comparing the detected temperature and the elapsed time with corresponding stored constants.

4. The method of claim 3 wherein the step of comparing includes the step of generating resultant parameters from the constants, each parameter defining a general capacity level of the cooking apparatus into zones, and the step of determining any of the zone corresponding to the computed value based on the resultant parameters.

5. A method for cooking food materials of varying volume in a cooking apparatus comprising the steps of:
   heating a quantity of food material to a prescribed set temperature in the cooking apparatus;
   stopping the heating for a first predetermined period for radiating heat from the food material;
   applying heat to the food material for a second prescribed period;
   detecting a final temperature of the food material;
   measuring a period elapsed from the step of heating a quantity of food material until the detecting step;
   computing a value, corresponding to the thermal capacity of the material in the cooking apparatus, from the detected temperature and the elapsed period; and
   starting a cooking operation to the food material in the cooking apparatus at a time corresponding to the computed value.

6. The method of claim 5 also including the step of manually entering a desired cooking completion time into an input device of the cooking apparatus and wherein the step of raising the temperature includes the step of automatically calculating the cooking operation period from the desired cooking completion time and the calculated value.

7. The method of claim 6 wherein the step of computing includes the step of obtaining prescribed stored constants from a memory by a controlled means and the step of comparing the detected temperature and the elapsed time with corresponding stored constants.

8. The method of claim 7 wherein the step of comparing includes the step of generating resultant parameters from the constants, each parameter defining a general capacity level of the cooking apparatus into zones, and the step of determining any of the zone corresponding to the computed value based on the resultant parameters.

9. A method for measuring food materials of varying volume in a cooking apparatus comprising the steps of:
heating a quantity of food material to a prescribed set temperature in the cooking apparatus;
stopping the heating for a first predetermined period for radiating heat from the food material;
applying heat to the food material for a second prescribed period;
detecting a final temperature of the food material;
measuring a period elapsed from the step of heating a quantity of food material until the detecting step; and
computing a value, corresponding to the thermal capacity of the food material in the cooking apparatus, from the detected temperature and the elapsed period.

10. The method of claim 9 also including the step of manually entering a desired cooking completion time into an input device of the cooking apparatus and wherein the step of raising the temperature includes the step of automatically calculating the cooking operation period from the desired cooking completion time and the calculated value.

11. The method of claim 10 wherein the step of computing includes the step of obtaining prescribed stored constants from a memory by a controlled means and the step of comparing the detected temperature and the elapsed time with corresponding stored constants.

12. The method of claim 11 wherein the step of comparing includes the step of generating resultant parameters from the constants, each parameter defining a general capacity level of the cooking apparatus into zones, and the step of determining any of the zone corresponding to the computed value based on the resultant parameters.

* * * * *

UNITED STATES PATENT AND TRADEMARK OFFICE
CERTIFICATE OF CORRECTION

PATENT NO. : 4,818,547
DATED : April 4, 1989
INVENTOR(S) : Yoshiyuki Miwa et al.

It is certified that error appears in the above-identified patent and that said Letters Patent is hereby corrected as shown below:

Please add the Assignee --KABUSHIKI KAISHA TOSHIBA-- to the first page of the patent.

Claim 1, Column 9, line 63, change "materals" to --materials--.

Signed and Sealed this

Fourteenth Day of November, 1989

*Attest:*

JEFFREY M. SAMUELS

*Attesting Officer*     *Acting Commissioner of Patents and Trademarks*